US008051430B2

(12) United States Patent
Rapp

(10) Patent No.: US 8,051,430 B2
(45) Date of Patent: Nov. 1, 2011

(54) SYSTEMS AND METHODS FOR DATA PROCESSING IN A SERVICE-ORIENTED ARCHITECTURE

(75) Inventor: Roman Rapp, Villeneuve Loubet (FR)

(73) Assignee: SAP AG, Walldorf (DE)

( * ) Notice: Subject to any disclaimer, the term of this patent is extended or adjusted under 35 U.S.C. 154(b) by 1616 days.

(21) Appl. No.: 11/392,830

(22) Filed: Mar. 30, 2006

(65) Prior Publication Data

US 2006/0233105 A1 Oct. 19, 2006

(30) Foreign Application Priority Data

Apr. 19, 2005 (EP) .................................... 05008515

(51) Int. Cl.
*G06F 9/54* (2006.01)
*G06F 15/16* (2006.01)
(52) U.S. Cl. ........................ 719/315; 709/202
(58) Field of Classification Search .................... 719/315
See application file for complete search history.

(56) References Cited

U.S. PATENT DOCUMENTS 6,378,002 B1 * 4/2002 Brobst et al. .................. 719/315
6,832,202 B1 12/2004 Schuyler et al.
2003/0080999 A1 * 5/2003 Stone et al. .................... 345/751
2004/0078802 A1 * 4/2004 Hammer et al. ............... 719/318
2004/0210445 A1 * 10/2004 Veronese et al. .................. 705/1

FOREIGN PATENT DOCUMENTS

EP 1 345 144 A2 9/2003

OTHER PUBLICATIONS

Rainer Schmidt, "Web Service Based Architectures to Support Dynamic Inter-organizational Business Processes", ICWS-Europe 2003.*
Mike P. Papazoglou and Jian Yang, "Design Methodology for Web Services and Business Processes", 2002.*
Pyarali et al., "An Overview of the Cobra Portable Object Adapter," Standard View, Association for Computing Machinery, New York, vol. 6, No. 1, Mar. 1998, pp. 30-43.
"Cobra Overview," Cobra Overview, 1999, p. 1-3.
Communication and Search Report from the European Patent Office, dated Sep. 9, 2005 (7 pages).

* cited by examiner

*Primary Examiner* — Lechi Truong
*Assistant Examiner* — Abdou Seye
(74) *Attorney, Agent, or Firm* — Finnegan, Henderson, Farabow, Garrett & Dunner, LLP

(57) ABSTRACT

Systems and methods are provided for data processing. In one implementation, a data process system is provided having a service-oriented architecture. The service-oriented architecture may include a plurality of foundation business objects and a dependent business object for providing a confirmation service for the plurality of foundation business objects.

16 Claims, 8 Drawing Sheets

SYSTEMS AND METHODS FOR DATA PROCESSING IN A SERVICE-ORIENTED ARCHITECTURE

CROSS-REFERENCE TO RELATED APPLICATION

This application is based upon and claims the benefit of priority from European Patent Application No. EP 05008515.8, filed Apr. 19, 2005, the entire contents of which are expressly incorporated herein by reference.

DESCRIPTION

I. Technical Field

The present invention generally relates to the field of data processing. More particularly, and without limitation, the invention relates to systems and methods for data processing in a service-oriented architecture.

II. Background Information

A service-oriented architecture (SOA) is essentially a collection of data processing services that communicate with each other. The communication may involve data passing between services or two or more services that coordinate an activity or data processing task. Prior art SOAs have some connecting infrastructure to provide communication between the data processing services and coordination.

Examples of SOAs include the Distributed Component Object Model (DCOM) that is based on the Common Object Request Broker Architecture (CORBA). A CORBA-based program can interoperate with any other CORBA-based program across multiple operating systems, programming languages, and networks. DCOM is an extension of the Component Object Model (COM) and is designed for use across multiple network transports, including Internet protocols such as HTTP. DCOM also works with both Java Applets and activeX components through its use of the COM.

SAP's Enterprise Services Architecture (ESA) is another more recent service-oriented architecture. ESA extends web services standards and service-oriented architecture principles to meet the needs of enterprise business solutions. ESA also helps information technology (IT) organizations leverage existing systems to build and deploy flexible solutions that support end-to-end business scenarios across heterogeneous data processing systems.

With multiple services communicating with one another, there is a need for systems and methods that provide a confirmation service in order to indicate completion of a particular task or data processing activity. Accordingly, there is a need for improved data processing systems and methods that facilitate the provision of a confirmation service in a service-oriented architecture.

SUMMARY

Embodiments consistent with implementations of the present invention provide a data processing system having a service-oriented architecture. The service-oriented architecture may comprise a plurality of foundation business objects and a dependent business object for providing a confirmation service for the plurality of foundation business objects.

Embodiments of the present invention further relate to a central confirmation service that can be used by multiple foundation business objects. Confirmation services are required for many different foundation business objects, such as business objects for planning a business trip, generating a travel expense report, making a purchase order, or providing a product cost estimate.

After an instance of a foundation business object has been created by an employee (i.e., the requester), confirmation (i.e., approval) by a higher instance is often required as a condition in order to further process the request. For example, the higher instance can be defined by the company's organizational hierarchy.

Embodiments consistent with the present invention can reduce the complexity of foundation business objects because foundation business objects do not need to include special confirmation program routines that are specific for the respective business object. Such specific program routines are replaced by a generic confirmation service that is based on a dependent business object that provides the confirmation service and interacts with the confirmer.

In accordance with another embodiment of the present invention, a foundation business object includes an interface to a dependent business object. The interface comprises a first set of methods for interoperability of an instance of the respective foundation business object with its dependent instance of the dependent business object.

In accordance with an embodiment of the present invention, the first set of methods comprises a first method for providing data indicative of a requester of a confirmation, a second method for providing data descriptive of the requester's request for which the confirmation is requested, a third method for receiving the confirmation, and a fourth method for receiving a rejection.

In accordance with an embodiment of the present invention, the first set of methods further comprises a fifth method for determining a confirmer for confirming or rejecting the request.

In accordance with another embodiment of the present invention, the dependent business object comprises an attribute for identification of an instance of one of the foundation objects from which an instance of the dependent business object depends and a second set of methods. The second set of methods comprises a first method for informing a confirmer of a requester's request, a second method for receiving a confirmation from the confirmer, and a third method for receiving a rejection from the confirmer.

In accordance with another embodiment of the present invention, the second set of methods comprises a fourth method for determining the confirmer.

In accordance with yet another embodiment of the present invention, the data processing system further comprises a database for storing a hierarchy of confirmers, wherein the fourth method of the second set of methods is adapted to determine one of the confirmers in the hierarchy of confirmers.

In accordance with another embodiment, the second set of methods further comprises a sixth method for storing an attachment.

Other embodiments of the present invention relate to a data processing method for a service-oriented architecture for providing a confirmation service. The method comprises instantiation of one of the foundation business objects by a requester, initiation of the instantiation of the dependent business object by the instantiated one of the foundation business objects, providing request information contained in the instantiated one of the foundation business objects to a confirmer by the instantiated dependent business object, receiving a confirmation or a rejection from the confirmer by the instantiated dependent business object, and forwarding the confirmation or rejection from the instantiated dependent business object to the instantiated one of the foundation business objects and to the requester.

In accordance with another embodiment of the present invention, a computer program product is provided for a service-oriented architecture. The computer program product implements a generic confirmation service by means of a dependent business object that can act as a confirmation service provider for a plurality of service consumers (i.e., instances) of the foundation business objects.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION OF THE EMBODIMENTS

Figure 1:
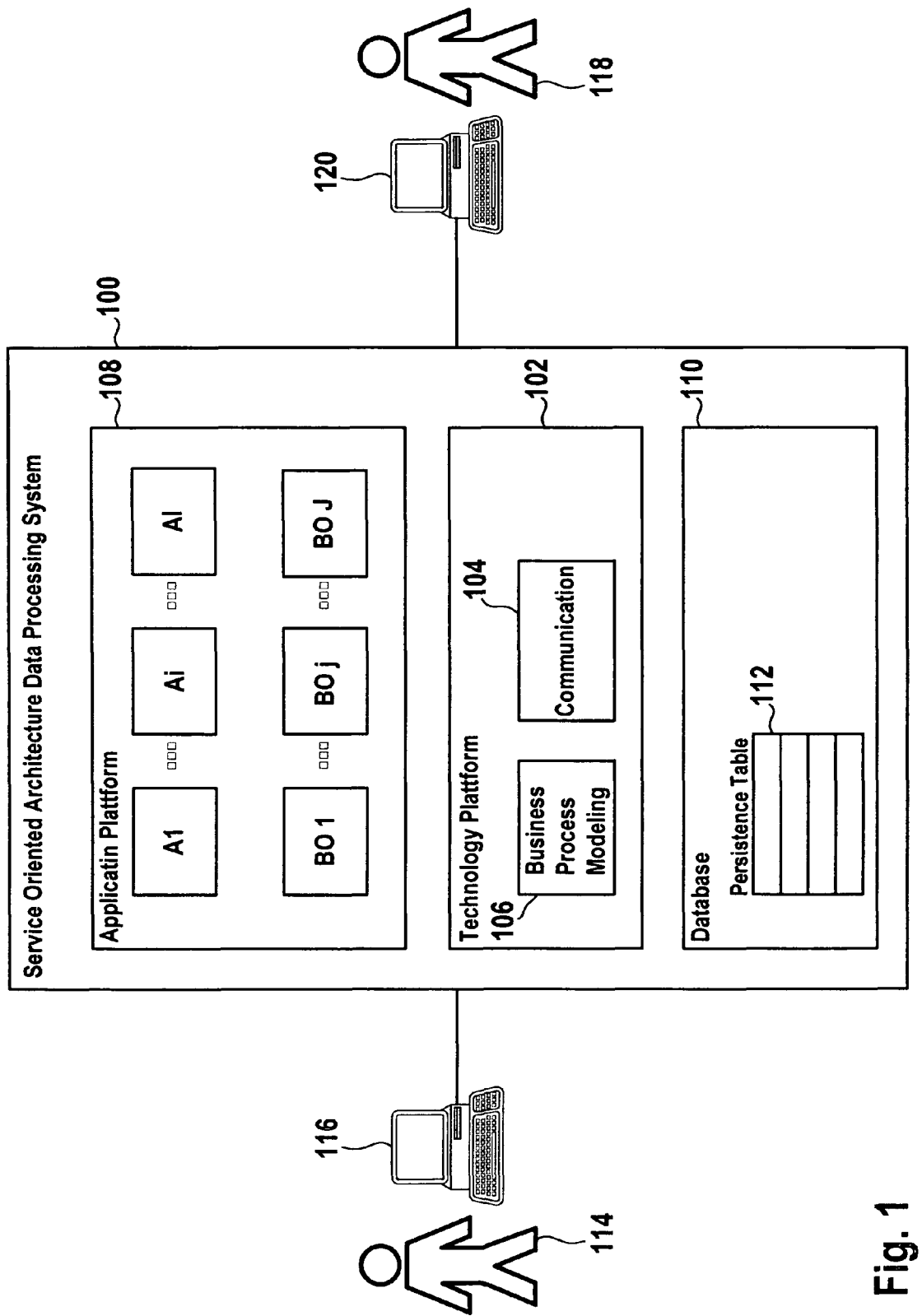
FIG. 1 is a block diagram of an exemplary data processing system that has a service-oriented architecture for providing a confirmation service, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

FIG. 1 shows a data processing system 100 that has a service-oriented architecture, such as SAP's Enterprise Services Architecture (ESA), consistent with an embodiment of the present invention. Data processing system 100 may be physically distributed over a number of computer systems that are interconnected by one or more networks. Furthermore, the various networked computer systems that constitute the data processing system 100 may use a number of different operating systems and programming languages.

The service-oriented architecture includes a technology platform 102 that provides the "glue" in order to bind the various computer systems to form the data processing system 100. Technology platform 102 includes a communication component 104 that enables the exchange of data across the various computer systems and networks. For example, communication component 104 may be implemented using SAP's Exchange Infrastructure (XI).

Technology platform 102 also includes a business process modeling component 106. Business process modeling component 106 serves to coordinate an interchange of data in the service-oriented architecture in accordance with certain business procedures. Component 106 may be implemented by means of, for example, the product ARIS that is commercially available from IDS Scheer. As further shown in FIG. 1, the service-oriented architecture of data processing system 100 may include an application platform 108 that uses the infrastructure provided by technology platform 102 to implement business logic. Application platform 108 may have an arbitrary number I of application programs A1, . . . , Ai, . . . , AI. Furthermore, application platform 108 may have an arbitrary number of J business objects BO1, . . . , BOj, . . . , BOJ. Consistent with certain embodiments of the present invention, the business objects (BOs) of application platform 108 are implemented as SAP business objects.

The services of SAP business objects may describe complete elementary steps in business processes, such as making a purchase order, providing a product cost estimate, invoicing a customer for a service, etc. These services can be implemented as methods of BOs. The encapsulation of the description of a complete business process step in such a business object reduces complexity because the inner structure of the business object remains concealed. By invoking services of the business objects, the external applications A1, . . . , AI may access and manipulate the business objects BO1, . . . , BOJ, e.g. via the Internet, SAP Exchange Infrastructure (XI), DCOM or CORBA, for example.

While the individual business objects describe complete elementary steps in business processes, business process modeling component 106 of technology platform 102 can describe complex workflows that involve multiple business processes steps and, thus, respective business objects services.

Embodiments of the present invention may incorporate foundation business objects and dependent business objects. By definition, an instantiated foundation business object is not dependent on any other business object or instance of a business object whereas, also by definition, an instantiated dependent business object has a dependency relationship with an instantiated foundation business object.

As further shown in FIG. 1, data processing system 100 may include at least one database 110. Database 110 can be a single physical database or may be a distributed database that is implemented using multiple computer systems of data processing system 100. Database 110 may store persistence tables 112 for storage of instances of business objects and events. This may enable the interchange of asynchronous messages and auditing of the business processes.

By way of example, FIG. 1 shows a user 114 and his or her personal computer 116 that is coupled to data processing system 100, as well as a user 118 and his or her personal computer 120 that is also coupled to data processing system 100. Typically, data processing system 100 has a large number of users depending on the size of the organization that runs data processing system 100, such as hundreds, thousands or hundreds of thousands users.

User 114 may be an employee that has to perform a certain action item or task that requires confirmation by user's 114 superior (i.e., user 118 in the example considered herein). User 118 may have the role of a confirmer.

To execute the action item, user 114 may enter data into his personal computer 116 for instantiating the respective business object that implements the elementary business process for execution of the action item. Such a business object is implemented as a foundation business object.

At least one of the business objects contained in application platform 108 is not a foundation business object, but a dependent business object. Furthermore, a service of a dependent business object does also describe an elementary business process step. However, a dependent business object differs from a foundation business object in that an instantiated dependent business object requires a dependency relationship to an instantiated foundation business object.

For example, business object BOj is a dependent business object that provides a confirmation service for obtaining confirmation. Business object BOj implements needed steps in the confirmation process in a generic way irrespective of the kind of action item or task that requires confirmation.

For example, a business object for making a purchase order is business object BO1. In this instance, user 114 enters data into his or her personal computer 116 for instantiating business object BO1. Instantiated business object BO1 initiates the instantiation of dependent business object BOj that provides the confirmation service. After instantiation of dependent business object BOj, instantiated dependent business object BOj executes a confirmation business process in order to obtain user's 118 confirmation or rejection as regards the action item (e.g., the purchase order in the example considered here).

Embodiments consistent with embodiments of the present invention may implement the steps of a confirmation process in a separate dependent business object such that confirmation business process do not need to be included in the various foundation business objects. This may substantially reduce the lines of code that are required for implementation of the foundation business objects.

Embodiments consistent with the present invention may provide increased flexibility. For example, if the confirmation business process needs to be changed, only the dependent business object that provides the confirmation business service needs to be changed correspondingly. The foundation business objects themselves do not require change.

Embodiments consistent with the present invention may also provide increased flexibility. For example, a user can search for a confirmation in which he or she is the requester or the confirmer with optionally specifying the business object type or the status of the confirmation.

Figure 2:
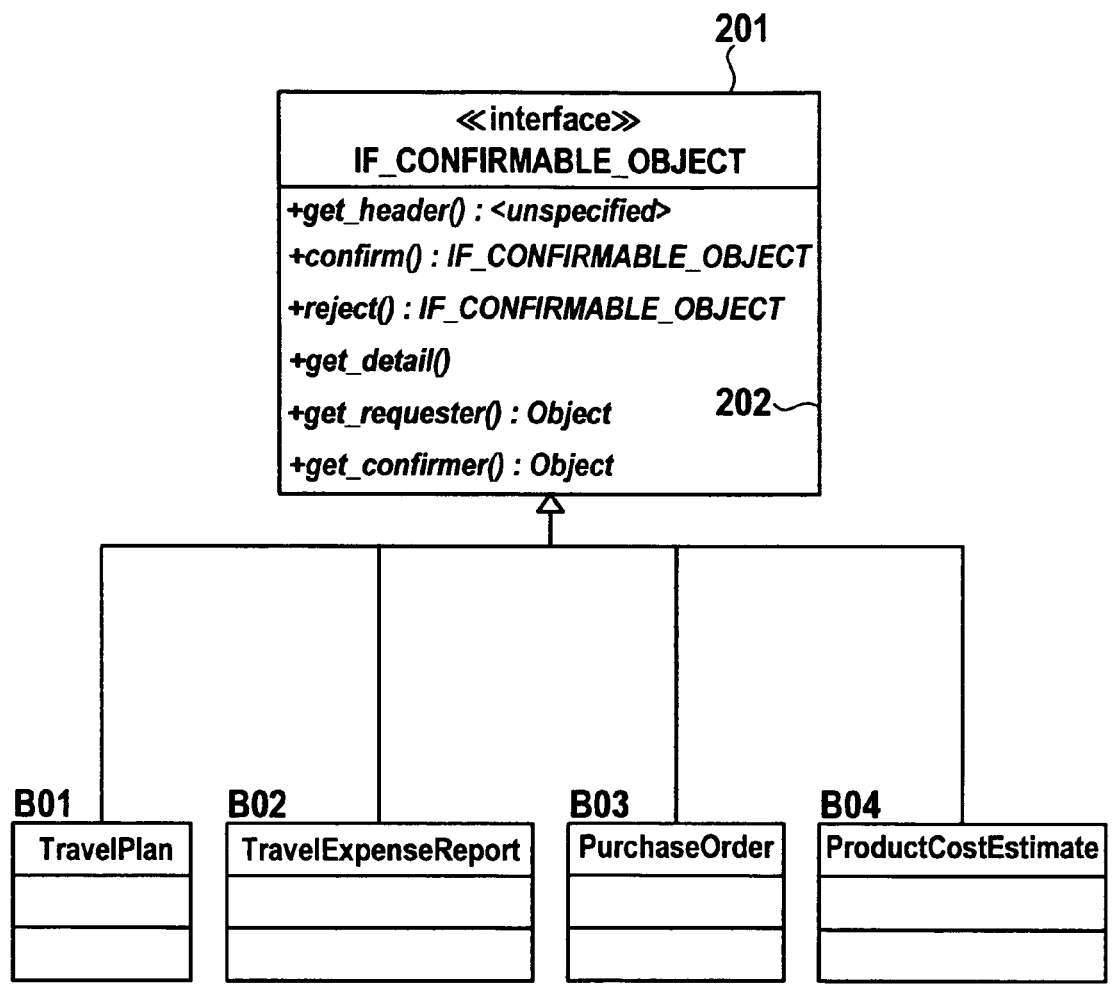
FIG. 2 is a class diagram illustrating exemplary foundation business objects having an interface to provide interoperability with a dependent business object that provides the confirmation service, consistent with an embodiment of the present invention.

FIG. 2 shows an exemplary interface 201 that foundation business objects may implement in order to provide interoperability with dependent business object BOj that provides the confirmation service, consistent with an embodiment of the present invention. In the present example, there are business objects BO1 "TravelPlan", BO2 "TravelExpenseReport", BO3 "PuchaseOrder", BO4 "ProductCostEstimate," etc.

The interface contains a number of methods 202, such as the method get_header, confirm, reject, get_detail, get_requester and get_confirmer. The functionalities of these methods will be explained in more detail below with reference to FIG. 5.

An instance of the foundation business object that has interface 201 for interoperability with the confirmation service will also be referred to in the following as "confirmable object." The dependent business object that provides the confirmation service will also be referred to in the following as a "confirmation service."

Figure 3:
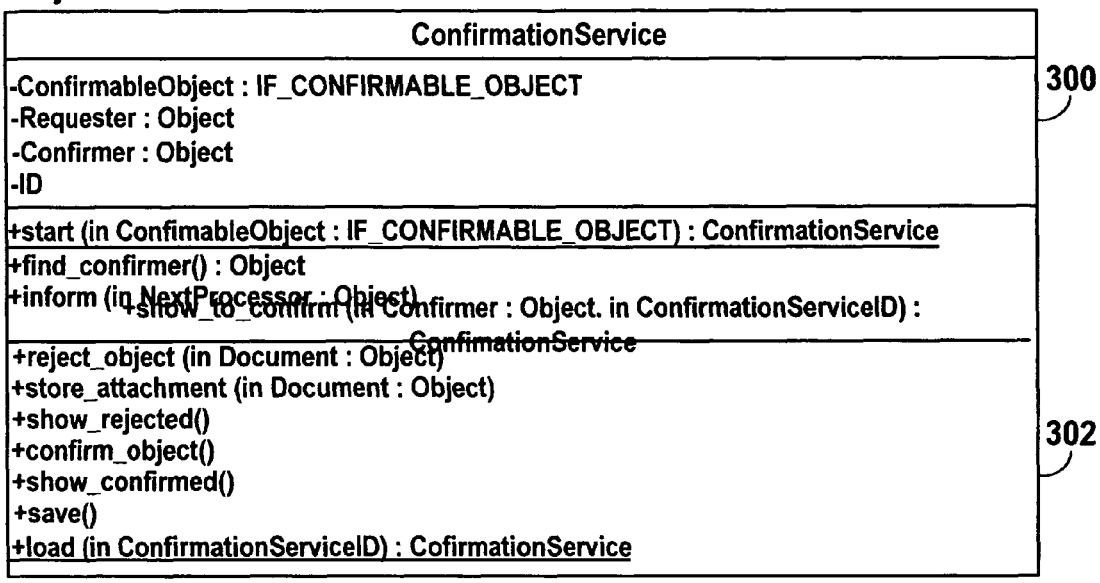
FIG. 3 illustrates the structure of an exemplary dependent business object, consistent with an embodiment of the present invention.

FIG. 3 shows the structure of an exemplary dependent business object BOj (i.e., the confirmation service), consistent with an embodiment of the present invention. The confirmation service may include a header 300 that contains a number of attributes, such as confirmable object, requester, confirmer and an identifier (ID) and a body 302 that contains various methods and class methods: find_confirmer, inform, reject_object, store_attachment, show_rejected, confirm_object, show_confirmed, save and the class methods start, show_to_confirm, and load.

The difference between a method and a class method is that a method can be called after instantiation and a class method can be called before instantiation of the dependent business object. The functionalities of the methods and class methods and the attributes of the confirmation service will be explained in more detail below with reference to FIG. 5.

Figure 4:
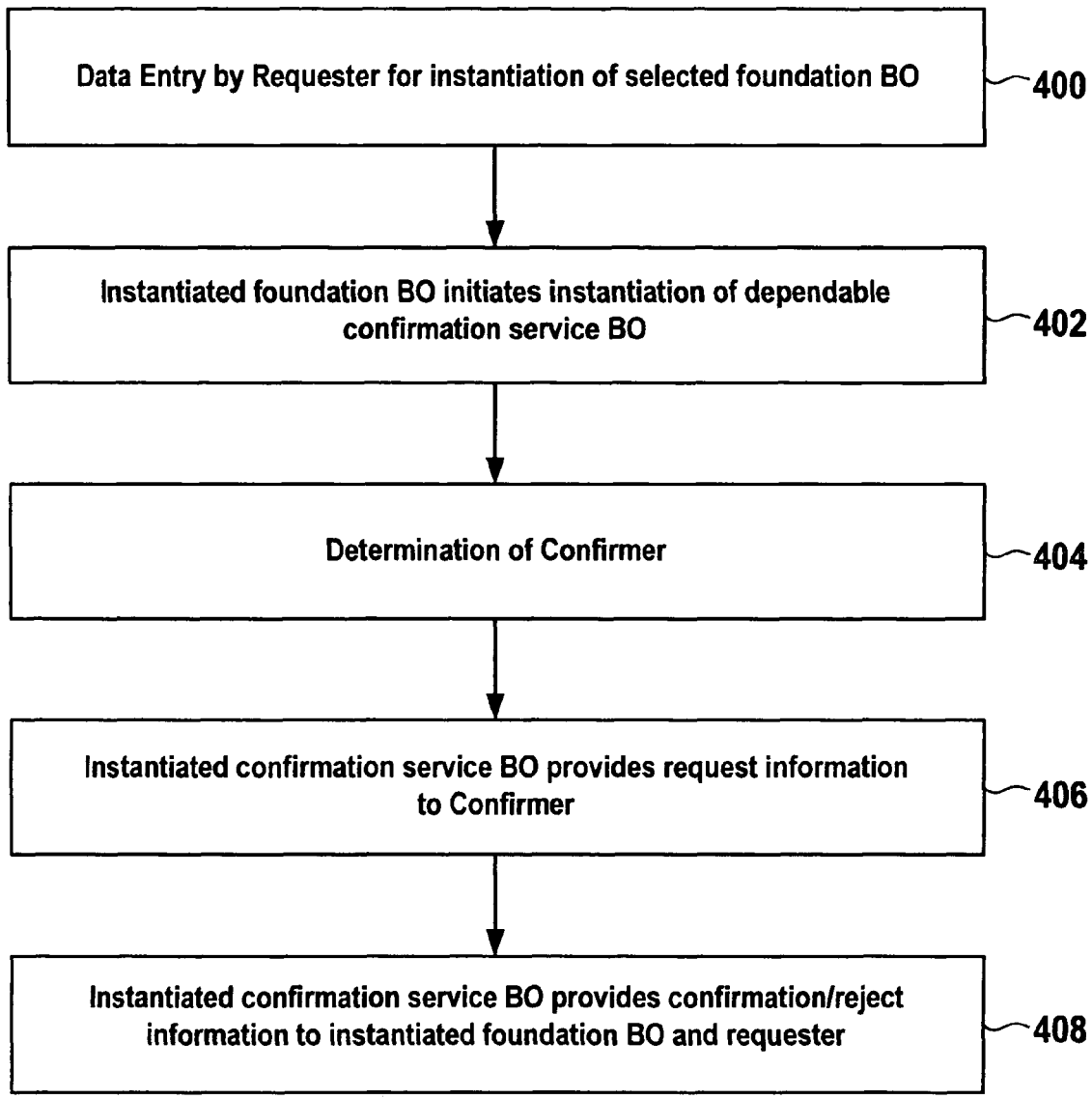
FIG. 4 is a flowchart illustrating an exemplary data processing method for providing a confirmation service in a service-oriented architecture, consistent with an embodiment of the present invention.

FIG. 4 shows a flowchart of an exemplary method involving the use of the confirmation service, consistent with an embodiment of the present invention. In step 400, a requester enters data for instantiation of a selected foundation business object for the execution of a certain action item, such as issuing a purchase order, making a product cost estimate, a travel expense report or a travel plan. In step 402, the instantiated foundation business object initiates an instantiation of the dependent business object, i.e., the confirmation service. The instantiated confirmation service depends on the instantiated foundation business object that has initiated the instantiation of the confirmation service.

In step 404, the confirmer that needs to make a decision for approving or rejecting the confirmation request is identified. Depending on the implementation, this step can be done by the instantiated foundation business object and/or by the instantiated confirmation service.

In step 406, the instantiated confirmation service provides request information to the confirmer. In other words, the confirmer receives a message that contains a link that enables access to the requester's request that requires the confirmation or the request itself. In response, the confirmer enters his or her confirmation or rejection. The instantiated confirmation service communicates this information to the instantiated foundation business object and to the requester in step 408.

Figure 5:
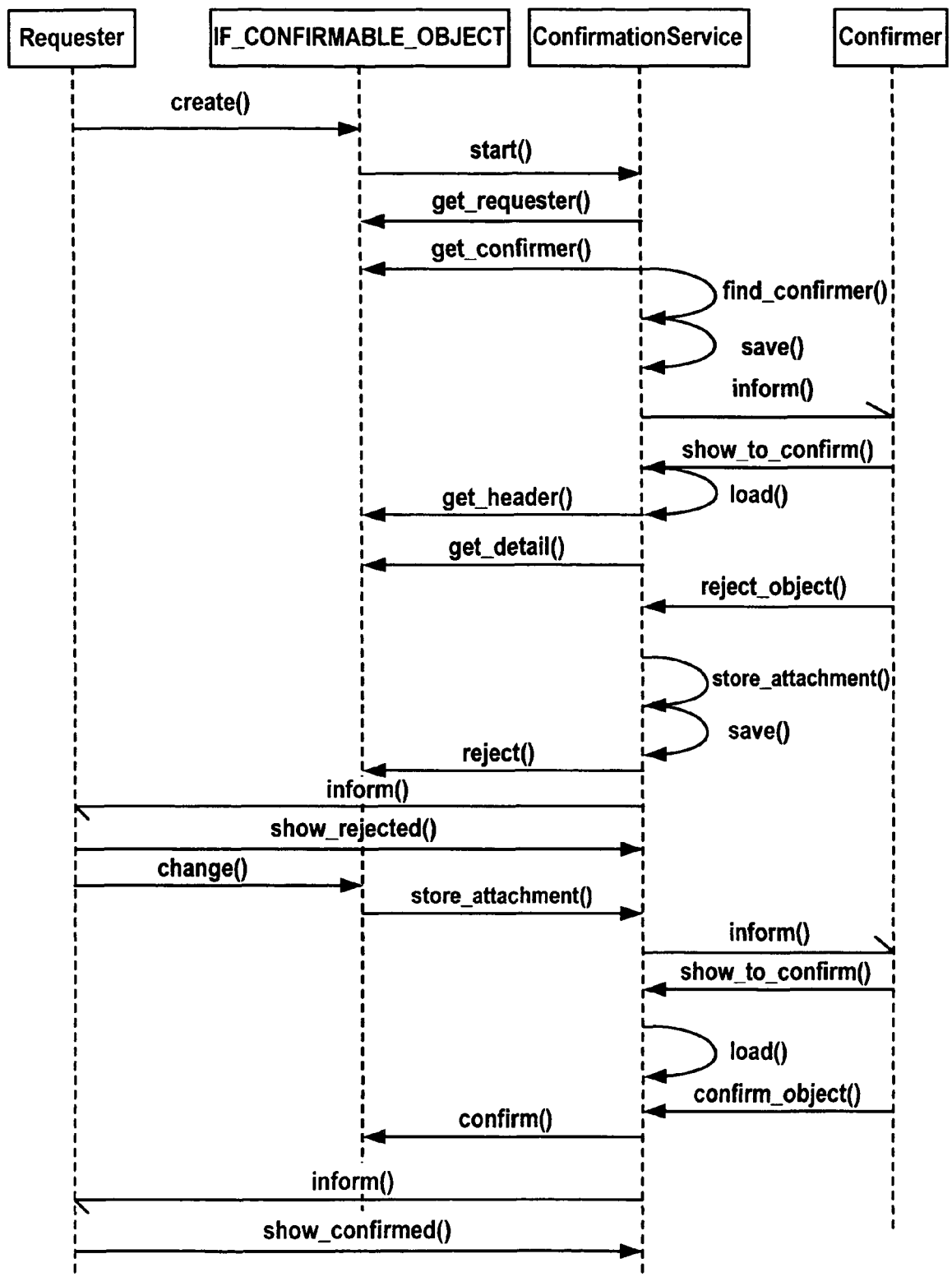
FIG. 5 is an sequence diagram illustrating an exemplary provision of a confirmation service, consistent with an embodiment of the present invention.

FIG. 5 shows a sequence diagram of an exemplary embodiment of a confirmation process using the methods contained in interface 202 and the attributes and methods of the confirmation service, consistent with an embodiment of the present invention. The sequence diagram illustrates the method calls between the requester, the interface of an instantiated foundation business object, the confirmation service, and the confirmer.

The requester calls the method "create" in order to create an instance of the selected foundation business object. Furthermore, the requester enters data descriptive of the request that requires confirmation for instantiation of the selected foundation business object. After instantiation of the foundation business object, the interface of the created confirmable object calls the method "start" of the dependent business object that provides the confirmation service. It is to be noted that the method "start" is a class method.

The method call "start" creates an instance of the dependent business object that depends on the confirmable object. This dependency relationship is stored in the header of the resultant confirmation service instance. The attribute "confirmable object" indicates the interface of the instantiated confirmable object from which the instantiated confirmation service depends.

Furthermore, an identifier (ID), such as a globally unique identifier (GUID), is generated for the instantiated confirmation service and stored as the attribute "ID" in the header of the instantiated confirmation service. In order to determine the requester, the instantiated confirmation service calls the method 'get_requester' of the interface.

In response, the interface returns data that indicates the requester, such as the requester's user ID. This may be stored as the attribute "requester" in the header of the instantiated confirmation service. Furthermore, the instantiated confirmation service calls the method "get_confirmer" of the interface. This method may or may not be implemented in the interface depending on the implementation.

If no response that identifies the confirmer is returned, the instantiated confirmation service uses its own method "find_confirmer" in order to determine the confirmer. For this purpose, the instantiated confirmation service may use a human resources database that stores a company's organizational hierarchy. For example, the confirmer is identified by means of the method "find_confirmer" by determining the requester's supervisor in the human resources database.

The confirmer may be identified by means of its user ID, which is stored as the attribute "confirmer" in the header of the instantiated confirmation service. The instantiated confirmation service is then persistently stored using its "save" method. For example, the save method may store the data that has been entered or retrieved for instantiating the confirmation service in a persistence table. The persistence table of the instantiated confirmation service can contain the following fields:

ID of the instantiated dependent business object,
time stamp when last action occurred,
confirmable object type,
confirmable object key,
requester,
confirmer, and
status of the request (new, confirmed, rejected, resent).

This persistence table enables the search for confirmations via any of the fields (e.g., search new requests from requester "xy" for object type "Travel Plan"). Such a query can be performed for any of the object types or without specifying an object type.

Every time an action occurs in the confirmation process, the data is persisted. This allows for an audit of the confirmation process and also enables a user to search for any confirmations independent of the business object. For example, a manager can search for any open confirmations he or she has to process.

After the instantiated confirmation service has been persistently stored by the method "save," the instantiated confirmation service uses its method "inform" in order to inform the confirmer of the requester's request that requires the confirmer's confirmation as a prerequisite in order to further process the request. This may be done by automatically generating and sending an email message to the confirmer that contains a hyperlink for access to the request or the request itself.

After some time, the confirmer may call the method "show_to_confirm" of the confirmation service. In response, the confirmation service uses its method "load" in order to reload the instantiated confirmation service from its persistence table. It is to be noted that the persistent storage of the instantiated confirmation service enables asynchronous messaging between the confirmation service and the confirmer for the confirmer's access to the request information. An immediate decision of the confirmer is not required while the instantiated confirmation object is still in the main memory. On the contrary, the confirmer can review the request even after an extended period (e.g., after the confirmer returns from a business trip or vacation without access to his or her e-mail).

After the loading of the instantiated confirmation service from the persistence table, the instantiated confirmation service calls the method "get_header" of the interface in order to get the header information of the requester's request. Furthermore, the instantiated confirmation service calls the method "get_detail" of the interface in order to obtain request details of the instantiated confirmable object. A user interface pattern is filled with the header and detail information obtained by the method calls "get_header" and "get_detail" for display on the confirmer's personal computer.

The confirmer may decide to reject the request. In this case, the confirmer calls the method "reject_object" of the instantiated confirmation service. As an option, the confirmer can provide an explanation of the reasons for his or her rejection in an attachment. The attachment is stored by the instantiated confirmation service using its method "store_attachment." The rejection and the attachment, if any, are persistently saved using the method "save" of the instantiated confirmation service.

Next, the instantiated confirmation service calls the method "reject" of the interface in order to inform the confirmable object of the confirmer's rejection. Furthermore, the instantiated confirmation service uses its method "inform" in order to inform the requester of the confirmer's rejection. The requester may call the method "show_rejected" of the instantiated confirmation service in order to view the rejection and the attachment containing the reasons for the rejection, if any.

The requester may then use a method "change" in order to change one or more details of his or her request. The requester may include an explanation of the changes and reasons why the requester considers the modified request acceptable in an attachment. In this instance, the interface calls the method "store_attachment" of the instantiated confirmation service for storage of the requester's attachment. In response, the instantiated confirmation service uses its method "inform" to inform the confirmer of the requester's response to the confirmer's rejection.

The confirmer may access the modified request and its attachment, if any, by calling the method "show_to_confirm" of the instantiated confirmation service. In response, the instantiated confirmation service uses its method "load" in order to reload the modified request information from the respective persistence table. If the modified request is acceptable to the confirmer, the confirmer enters his or her confirmation and the method "confirm_object" of the instantiated confirmation service is called. In response, the instantiated confirmation service calls the method "confirm" of the interface and uses its method "inform" to inform the requester of the confirmer's confirmation. The requester may then call the method "show_confirmed" of the instantiated confirmation service to view the confirmer's confirmation.

Figure 6:
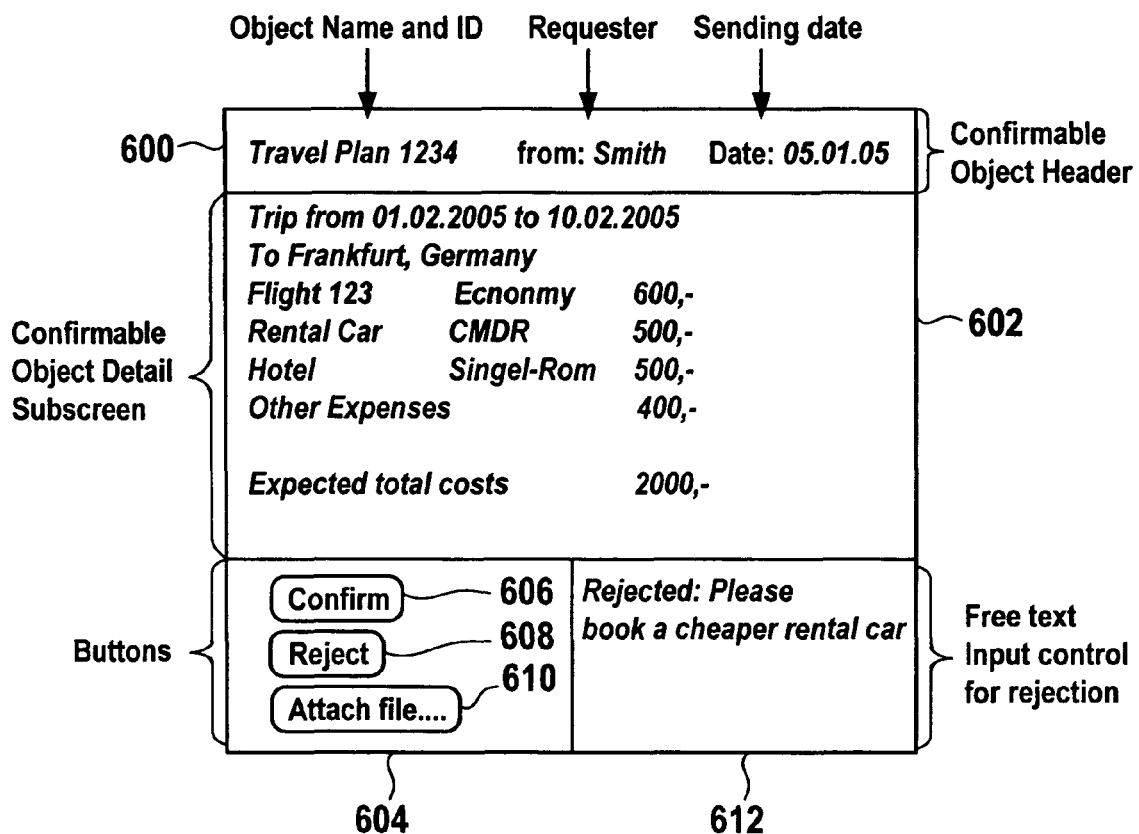
FIG. 6 shows an exemplary user interface pattern for a confirmation service of a travel plan foundation business object, consistent with an embodiment of the present invention.

FIG. 6 shows an exemplary user interface pattern that is filled with request details in order to inform a confirmer of the requester's request, consistent with an embodiment of the present invention. The user interface pattern with the request details is displayed on the confirmer's personal computer in response to the confirmer's method call "show_to_confirm." The user interface pattern may include a header portion 600, a body portion 602, a command portion 604 containing a number of virtual buttons, such as buttons 606, 608, 610, and a text entry portion 612.

The user interface pattern of FIG. 6 is filled with request details for a requester's travel plan. In this instance, the confirmable object header contains an identifier or key of the instantiated foundation business object "travel plan" (e.g., "1234," the requester "Smith," and the date when the request for confirmation of the travel plan has been sent, "06.01.05").

The body of the user interface pattern contains confirmable object details (i.e., details of the travel plan for which confirmation is requested by the requester). By clicking on button 606, the confirmer can confirm the request, whereas by clicking on button 608, the confirmer can enter his or her rejection of the request. For explanation of the grounds for his or her rejection, the confirmer can attach a file by clicking on button 610. Alternatively, or in addition, the confirmer can enter an explanation into text entry portion 612.

Figure 7:
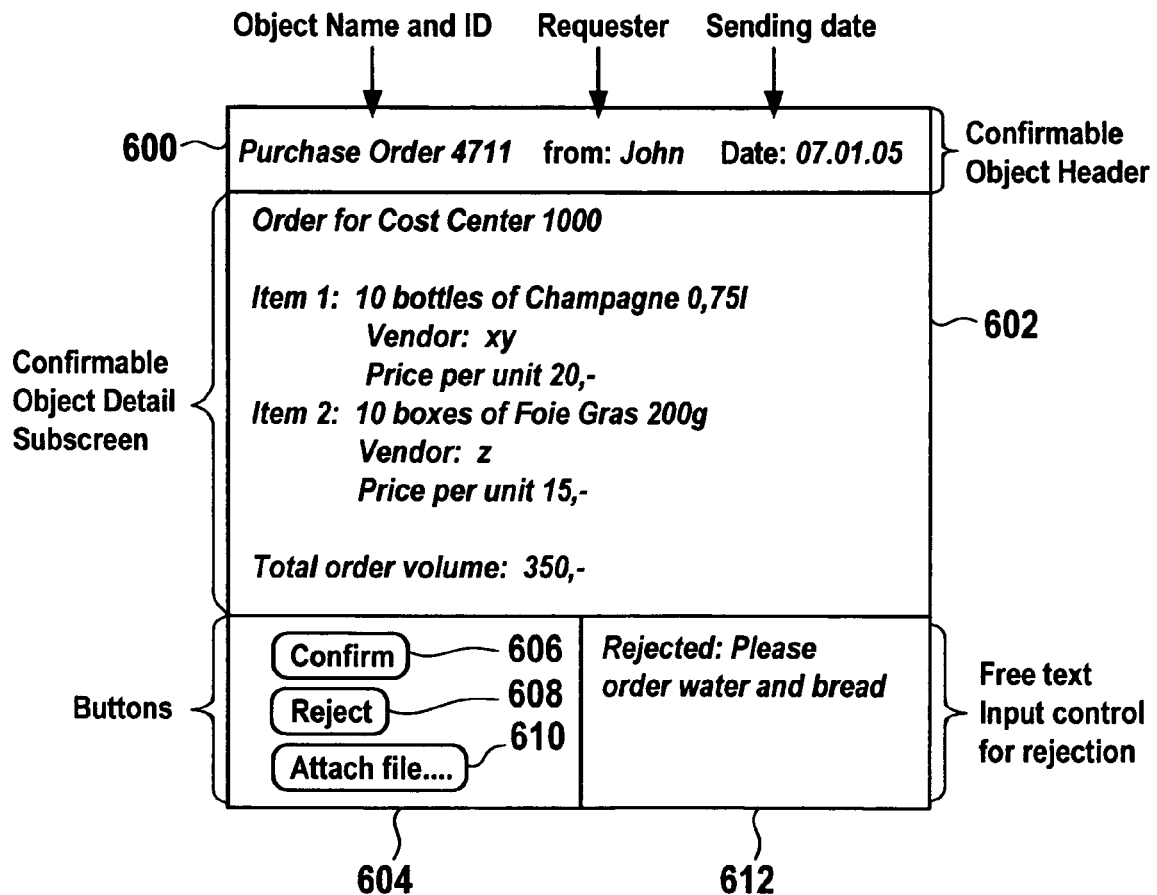
FIG. 7 shows an exemplary user interface pattern for a confirmation service with the example of a purchase order foundation business object, consistent with an embodiment of the present invention.

FIG. 7 shows the same user interface pattern of FIG. 7, but with respect to an instantiated purchase order, consistent with an embodiment of the present invention. In this instance, header portion 600 indicates the ID of the purchase order, the requester and the sending date. Body portion 602 contains details of the request to be confirmed (i.e., details of the purchase order including the items to be ordered and the respective prices). The command and text entry portions 604, 612 are the same as in the embodiment of FIG. 6.

Figure 8:
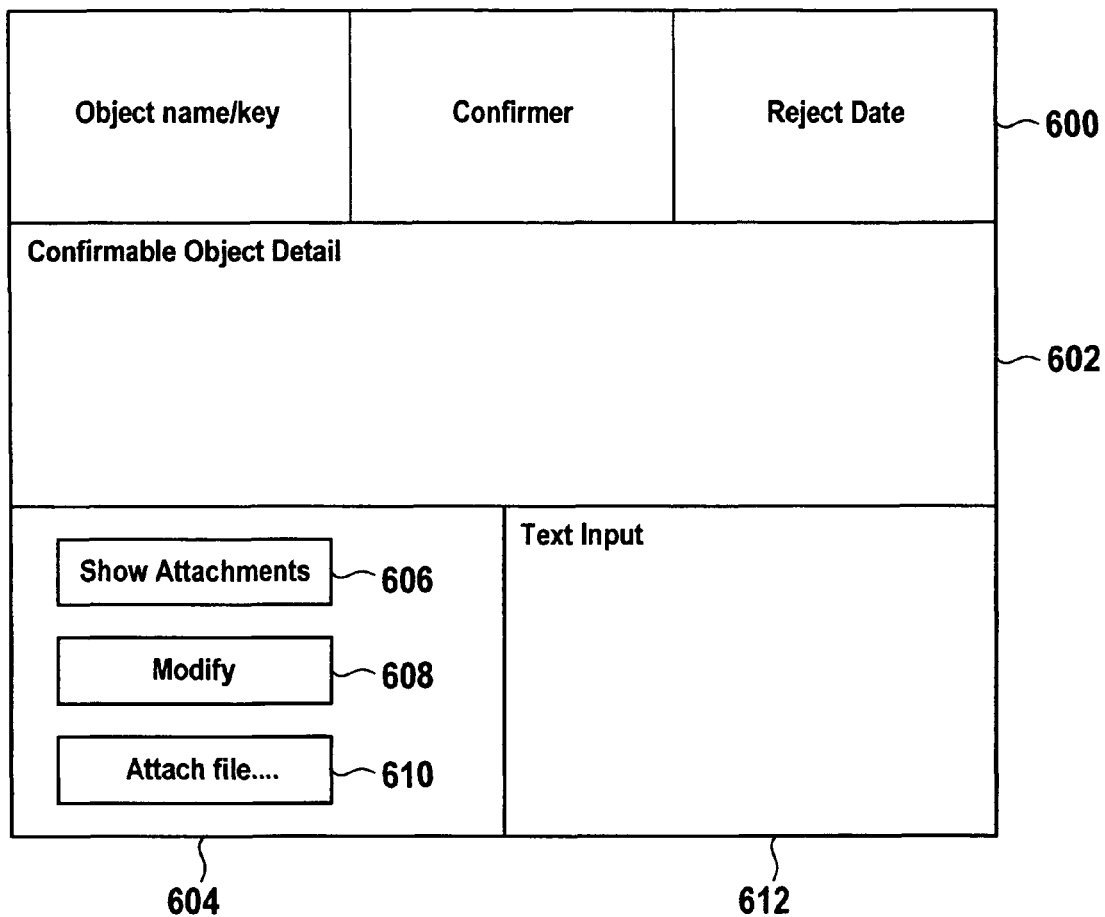
FIG. 8 shows an exemplary user interface pattern for communicating a confirmer's rejection to the requester, consistent with an embodiment of the present invention.

FIG. 8 shows the user interface pattern of FIGS. 6 and 7 when used for informing the requester of the confirmer's rejection, consistent with an embodiment of the present invention. In this instance, header portion 600 indicates the rejected instantiated business object's name or key, the name of the confirmer who has rejected the request, and the date when the rejection has been sent. Body portion 602 contains the confirmable object details as in the embodiments of FIGS. 6 and 7.

Buttons 606, 608, 610 of the command portion 604 have the following assignments. If the requester clicks on button 606, attachments that have been attached by the confirmer in order to provide reasons for his or her rejection are opened. If the user clicks on button 608, he or she can modify the request in order to obtain confirmation for the modified request. If the user clicks on button 610, he or she can attach a file giving an explanation of why the modified request should be approvable by the confirmer. As in the embodiments of FIGS. 6 and 7, the requester can also enter text into text entry portion 612.

Accordingly, embodiments consistent with the present invention may provide a user interface pattern that may form an integral part of the dependent business object that provides the confirmation service and which avoids a need to include multiple user interface patterns into the various foundation business objects.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and method consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, CD-ROM, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A data processing system having a service-oriented architecture for providing a confirmation service, the data processing system comprising:
 a database storing a hierarchy of confirmers; and
 at least one processor executing a set of instructions to:
  initiate one of a plurality of foundation business objects based on a request from a requester to create an instance of the one of the plurality of foundation business objects,
  initiate a dependent business object to create an instance of the dependent business object, the instance of the dependent business object including an attribute for identifying the one of the plurality of foundation business objects upon which it depends,
  store the instance of the dependent business object in a persistence table in the database,
  identify a confirmer,
  provide request information, contained in the instance of the one of the plurality of foundation business objects, to the confirmer using the instance of the dependent business object,
  receive a confirmation or a rejection from the confirmer, and
  forward the confirmation or rejection from the instance of the dependent business object to the instance of the one of the plurality of foundation business objects and to the requester.

2. The data processing system of claim 1, wherein the one of the plurality of foundation business objects includes an interface to the dependent business object, the interface comprising a first set of methods.

3. The data processing system of claim 2, wherein the first set of methods comprises a first method for providing data indicative of a requester of the confirmation, and a second method for providing data descriptive of the requester's request for which the confirmation is requested.

4. The data processing system of claim 3, wherein the first set of methods is used to identify the confirmer.

5. The data processing system of claim 1, wherein the dependent business object comprises a second set of methods, the second set of methods comprising a first method for informing the confirmer of a requester's request, a second method for receiving the confirmation from the confirmer, and a third method for receiving the rejection from the confirmer.

6. The data processing system of claim 5, wherein the second set of methods further comprises a fourth method for the identifying of the confirmer.

7. The data processing system of claim 6, wherein the fourth method of the second set of methods determines a confirmer from the hierarchy of confirmers in the database.

8. The data processing system of claim 5, wherein the second set of methods further comprise a fifth method for storing an attachment.

9. A computer-implemented method for a service-oriented architecture for providing a confirmation service, the method being performed by at least one processor and comprising:
   instantiating one of a plurality of foundation business objects in response to a request from a requester to create an instance of the one of the plurality of foundation business objects;
   instantiating a dependent business object in response to a request from the instance of the one of the plurality of foundation business objects to create an instance of the dependent business object, the dependent business object including an attribute for identifying the one of the plurality of foundation business objects upon which it depends;
   storing the instance of the dependent object in a persistence table;
   identifying a confirmer;
   providing request information, contained in the instance of the one of the plurality of foundation business objects, to the confirmer by the instance of the dependent business object;
   receiving a confirmation or a rejection from the confirmer by the instance of the dependent business object; and
   forwarding the confirmation or rejection from the instance of the dependent business object to the instance of the one of the plurality of foundation business objects and to the requester.

10. The method of claim 9, wherein the identifying a confirmer comprises determining a confirmer by a first method of the instance of the one of the plurality of foundation business objects.

11. The method of claim 10, wherein the identifying a confirmer further comprises determining a confirmer by a second method of the instance of the dependent object when the first method does not return data specifying the confirmer.

12. The method of claim 9, further comprising providing a database with a hierarchy of confirmers, wherein the identifying a confirmer comprises determining a confirmer from the hierarchy of confirmers.

13. A non-transitory computer-readable medium comprising a set of instructions executable by at least one processor for performing a method for a service-oriented architecture to provide a confirmation service, the method comprising:
   instantiating one of a plurality of foundation business objects in response to a request from a requester to create an instance of the one of the plurality of foundation business objects;
   instantiating a dependent business object in response to a request from the instance of the one of the plurality of foundation business objects to create an instance of the dependent business object, the dependent business object including an attribute for identifying the one of the plurality of foundation business objects upon which it depends;
   storing the instance of the dependent object in a persistence table;
   identifying a confirmer;
   providing request information, contained in the instance of the one of the plurality of foundation business objects, to the confirmer by the instance of the dependent business object;
   receiving a confirmation or a rejection from the confirmer by the instance of the dependent business object; and
   forwarding the confirmation or rejection from the instance of the dependent business object to the instance of the one of the plurality of foundation business objects and to the requester.

14. The computer-readable medium of claim 13, wherein the identifying a confirmer comprises determining a confirmer by a first method of the instance of the one of the plurality of foundation business objects.

15. The computer-readable medium of claim 14, wherein the identifying a confirmer further comprises determining a confirmer by a second method of the instance of the dependent object when the first method does not return data specifying the confirmer.

16. The computer-readable medium of claim 13, further comprising providing a database with a hierarchy of confirmers, wherein the identifying a confirmer comprises determining a confirmer from the hierarchy of confirmers.

* * * * *